Sept. 26, 1950 H. E. GORDON 2,523,657
MULTIPARTY MESSAGE RATE LINE CIRCUIT
Filed Oct. 7, 1946
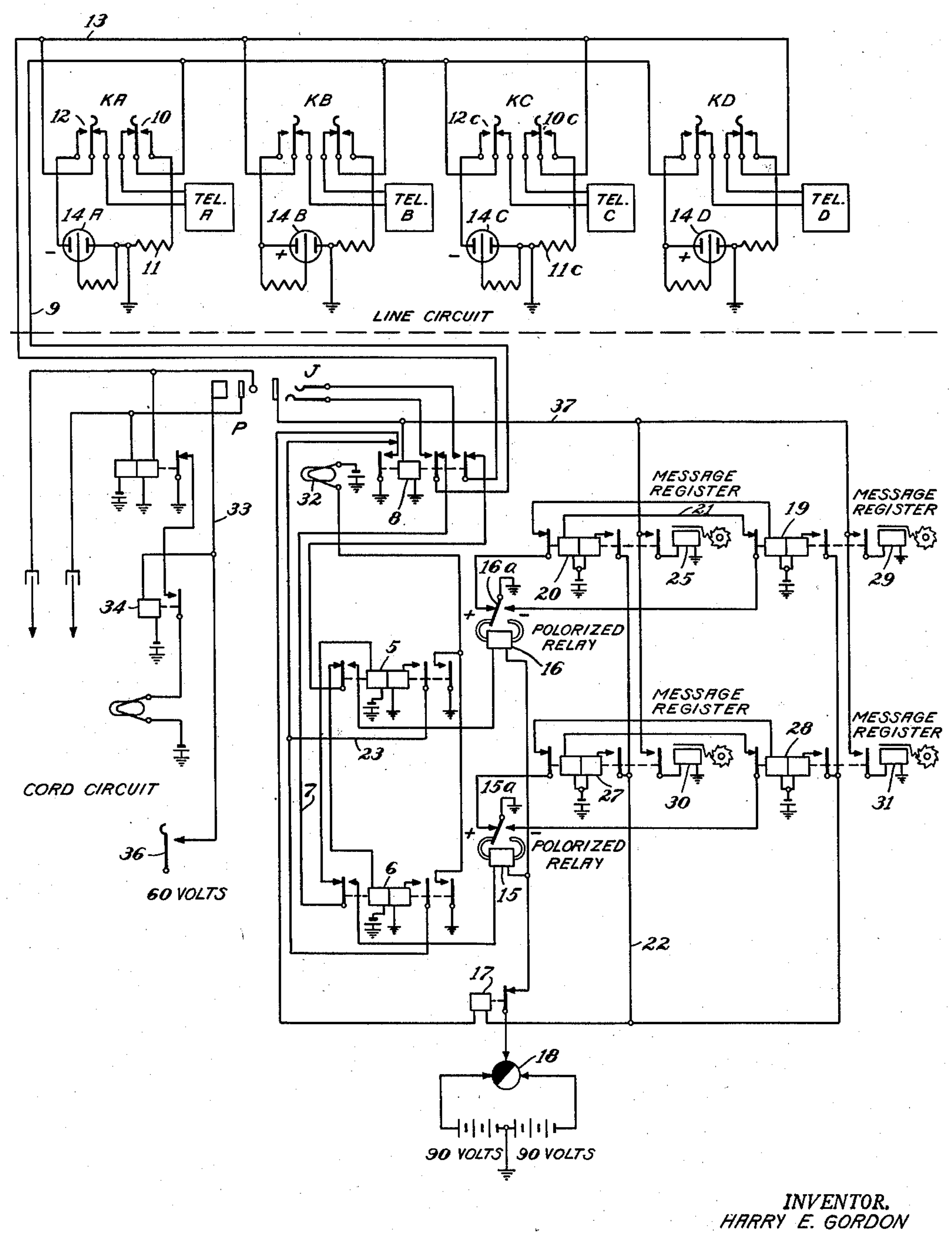
INVENTOR.
HARRY E. GORDON
BY D. Clyde Jones
ATTORNEY Patented Sept. 26, 1950

2,523,657

UNITED STATES PATENT OFFICE 2,523,657

MULTIPARTY MESSAGE RATE LINE CIRCUIT

Harry E. Gordon, Rochester, N. Y., assignor to Rochester Telephone Corporation, Rochester, N. Y., a corporation of New York Application October 7, 1946, Serial No. 701,737

3 Claims. (Cl. 179—8.5)

This invention relates to a multi-party, message rate telephone line circuit, arranged for automatic selection of a message register individual to each calling party on that line.

The purpose of the invention is to provide an arrangement of this type which will reliably charge a call only to the party that originates the call, which has a minimum of equipment failures and which is relatively inexpensive to install and to maintain.

The various features and advantages of the invention will appear from the detailed description and claims when taken with the single figure of the drawing. Above the broken line in this drawing, there is diagrammatically illustrated the outside portion of a multi-party telephone line with four substations provided thereon. Below the broken line, there is diagrammatically illustrated the line equipment located at the telephone exchange. Of this exchange equipment, there is illustrated at the left of the drawing a fragment only of a connecting link, herein shown as the answering end of a cord circuit. At the lower center and at the right-hand portion of the drawing, there is shown that part of the exchange apparatus individual to a telephone line.

Each telephone line is provided with four substations A, B, C, and D having the usual transmitter, receiver and ringer circuits thereat. As a part of this invention, each substation is provided with a push button calling key and with a cold cathode rectifier of the type now sold under the code number 333A. The keys and the rectifiers respectively located at the substations A, B, C, D, are designated KA, KB, KC, KD and 14A, 14B, 14C and 14D. It will be noted that the rectifiers 14A and 14B are both related to the tip side of the line, rectifier 14A being related thereto in a negative sense and the rectifier 14B in a positive sense. The rectifiers 14C and 14D, however, are related to the ring side of the line, the rectifier 14C being related thereto in a negative sense and the rectifier 14D in a positive sense.

It is believed that the invention will best be understood by describing the registration of a call originated on a calling telephone line. The subscriber initiates a call by depressing the push button key KA located at the subscriber's substation A. This connects the line conductor 9, to ground. As a result of this, the tip line relay 5 is energized from grounded battery through its left-hand winding, back contact and armature of the ring line relay 6, conductor 7, back contact and armature of the cut-off relay 8, conductor 9, contacts 10 of the key KA now closed thence through the one hundred ohm resistor 11, to ground. The relay 5 is energized in this circuit and at its left-hand armature and back contact, interrupts the circuit through which the ring line relay 6 might be energized. Also when the key KA is depressed, it closes its contacts 12 to connect the tip side of the line 13, through the cold cathode rectifier 14A, to ground. When the tip line relay 5 is energized as just described, the grounded tip conductor 13 is extended through the outer right-hand armature and back contact of the cut-off relay 8, the left-hand armature and front contact of the line relay 5 winding of the tip polarized relay 16, back contact and armature of the selecting cut-off relay 17, through the rotating interruptor 18 and thence alternately, to the positive and negative sides of battery, respectively. Since the rectifier 14A is connected in such a manner as to respond to negative currents, when the interruptor 18 connects the negative terminal of battery to the circuit just described, the tip polarized relay 16 is operated to swing its armature 16$a$ toward the right, namely toward its negative contact. As a result of this operation, the tip negative register selecting relay 20 is energized in a circuit traceable from grounded battery, left-hand winding of relay 20, conductor 21, left-hand back contact and armature of the tip positive register selecting relay 19, contact 16$a$ in its right-hand position, to ground. On operation, the register selecting relay 20 locks itself operated in a circuit traceable from grounded battery, right-hand winding of this relay, its front contact and armature, conductor 22, through the winding of the selecting cut-off relay 17, continuity spring and back contact of the cut-off relay 8, conductor 23, armature, front contact and winding of the tip line relay to grounded battery. In addition to locking the relay 20 operated, the last described circuit also maintains the tip line relay 5 in its operated condition. With the message selecting relay 20 thus operated it prepares a circuit for the operation of the message register 25 which is individual to the calling substation A. Also when the relay 20 operates, it interrupts at its left-hand armature and back contact, the circuit which might operate the tip register selecting relay 19. Thus, only one message register selecting relay of the two that are connected to a given side of the subscriber's line, for example the tip side, can be operated. Also as soon as the selecting cut-off relay 17 is operated, it interrupts the circuit over which the ring polarized relay 15 or the tip polarized relay 16 can be operated. Since the ring line relay 6 has been previously disconnected, the two message register selecting relays 27 and 28, related to the ring side of the line, are also disconnected so that only one message register namely register 25 is connected to the sleeve conductor of the calling line. The other three registers 29, 30 and 31, are locked out and thereby disabled during the call under consideration.

When the tip line relay 5 operates, it closes an obvious circuit for the line lamp 32 which lamp lights to signal the operator that a call has been originated. The operator then inserts the plug P of an idle cord circuit into the jack J of the calling line. As a result of this connection, the cut-off relay 8 is energized from grounded battery, winding of this relay, sleeve contacts of the jack J and plug P, conductor 33, winding of the sleeve relay 34, to ground. The cut-off relay when energized, at its right-hand armatures and front contacts connects the tip conductor 13 and the ring conductor 9 of the calling line through to the tip and ring contacts of the jack J which are now in engagement with the tip and ring contacts of the plug P. At the right-hand back contacts and armatures of the cut-off relay 8, the tip conductor 13 and the ring conductor 9 are disconnected from the line relays 5 and 6 respectively so that there can be no disturbance of the message registration conditions just established. At the left-hand armature and continuity spring of the cut-off relay 8, ground is applied to the locking circuit for the selecting cut-off relay 17 and for the operated message register selecting relay 20.

With the message register 25 connected to the sleeve conductor of the calling line, this register can be operated in the same manner and under the same conditions as a conventional message register on a individual telephone line. As herein illustrated, the operator actuates the message register key 36 to apply 60-volt current over the sleeve conductors 33 and 37, front contact and armature of relay 20, winding of the message register 25, to ground. The register 25 is thus operated to charge for the call.

When the subscriber at substation B initiates a call by depressing the key KB thereat, the tip line relay 5 and the tip polarized relay 16 will be energized in the same manner as when the subscriber at A originated a call. However, the rectifier 14B is related to the tip side 13 of the line in a positive sense. Thus, when the key KB is depressed, the tip polarized relay 16 is operated in its positive sense to close contact 16$a$ in its left-hand position. As a result of this, the tip register relay 19 is operated to select the register 29. Relay 19, at its left-hand back contact and armature, interrupts the energizing circuit of the register relay 20 so that register 25 cannot be operated at this time to register a call. The registers 30 and 31 are also disabled at this time, since on operation, the tip line relay 5 opens its left-hand back contact and armature, the circuit of the ring line relay 6. Inasmuch as the relay 6 is not operated, the ring polarized relay 15 cannot be operated so that neither of the register relays 27 or 28 can be operated to associate its related register 30 or 31 with the sleeve conductor 37.

When the subscriber at substation C depresses the key KC thereat, the ring line relay 6 is energized in a circuit traceable from grounded battery, left-hand winding of this relay, left-hand back contact and armature of the tip line relay 5, back contact and armature of the cut-off relay 8, conductor 13, contacts 10$c$ of the key KC, thence through the one hundred ohm resistor 11$c$, to ground. The ring line relay 6 when energized, at its left-hand armature and back contact, interrupts the operating circuit of the line relay 5 so that it cannot be energized at this time. At the left-hand armature and front contact of the relay 6, a break point is closed in the energizing circuit of the ring polarized relay 15. Consequently, when the interruptor 18 is connected to the negative terminal of the battery, the polarized relay 15 will be energized in a circuit from the interruptor, armature and back contact of the selecting cut-off relay 17, winding of the polarized relay 15, front contact and armature of the ring line relay 6 back contact and armature of the cut-off relay 8, conductor 9, thence through the key contacts 12$c$ at the substation C, rectifier 14C to ground. In response to the completion of this circuit, the polarized relay 15 operates its contact 15$a$ into its right-hand position. This completes a circuit for energizing the register relay 27, the circuit extending from grounded battery through the left-hand winding of this relay, back contact and armature of the register relay 28, contacts 15$a$ to ground. The register relay 27 on operation connects its register 30 to the sleeve conductor 37 of the calling line. At the left-hand armature and back contact of relay 27, the operating circuit of the register relay 28 is interrupted so that this relay will not operate at this time. At the right-hand armature and front contact, the relay 27 is locked operated in the same manner as relay 20 as previously described. The remainder of the operations involved in completing the call are the same as already described.

When the subscriber at substation D initiates a call by depressing the key KD thereat, the ring line relay 6 will be operated in the same manner as when the key KC at station C was depressed. In this instance, however, the polarized relay 15 will operate its contacts 15$a$ to the left or positive position. This completes a circuit for the register relay 28, which operates to open the energizing circuit of register relay 27 and to connect the register 31 to the sleeve conductor 37. The remaining operations in connection with this call will be obvious from the foregoing description.

It will be understood that if the present invention is used in an automatic telephone system, the line relay such as 5, which is operated on the initiation of a call, will cause a line switch (not shown) to select the calling line and to operate the cut-off relay 8 in the usual manner to cut-off the operated line relay 5.

What I claim is:

1. In a telephone system, a telephone exchange, a telephone line comprising tip and ring conductors extending to said exchange, a link at said exchange connectible to said telephone line on the initiation of a call thereon, two pairs of substations on said line, means including a key at each substation of the first pair to connect the tip conductor of said telephone line to ground on the initiation of a call from either of said last mentioned pair of substations, means including a key at each substation of the second pair of substations being adapted to connect the ring conductor to ground on the initiation of a call from either of them, a single unilateral current distinguishing device at each substation of the first pair connectible to said ring conductor on the operation of its related key, one device of a pair being connected to said ring conductor to pass current in one direction thereover, the other device of the pair being connected to said ring conductor to pass current in the other direction thereover, the unilateral current conducting devices of the second pair of substations being similarly connectible to the tip conductor, a tip line relay associated with each line and adapted to be energized when the tip conductor thereof is grounded, a ring line relay associated with said telephone line and adapted to be energized when the ring conductor thereof is connected to the ground, a polarized relay individual to each pair of substations and operative in one sense under control of the line relay thereof, by current flow through one device thereof and operative in the other sense by current flow through a device in the other direction, message register selecting mechanisms selectively operated in accordance with the operation of said polarized relay, means including said selecting mechanism for rendering operative the message register of the calling substation to the exclusion of the other message registers individual to the other substations on said line, and means including said link circuit for operating the selected message register.

2. In a telephone system, a telephone exchange, a telephone line comprising tip and ring conductors extending to said exchange, a link at said exchange connectible to said telephone line on the initiation of a call thereon, two pairs of substations on said line, means including a key at each substation of the first pair to connect the tip conductor of said telephone line to ground on the initiation of a call from either of said last mentioned pair of substations, means including a key at each substation of the second pair of substations adapted to connect the ring conductor to ground on the initiation of a call from either of them, a unilateral current conducting device at each substation of the first pair connectible to said ring conductor on the operation of its related key, one device of a pair being connected to said ring conductor to pass current in one direction thereover, the other device of the pair being connected to said ring conductor to pass current in the other direction thereover, the unilateral current conducting devices of the second pair of substations being similarly connectible to the tip conductor, a tip line relay associated with each line and adapted to be energized when the tip conductor thereof is grounded, a ring line relay associated with said telephone line and adapted to be energized when the ring conductor thereof is connected to the ground, sources of current of opposite polarity at said exchange, a polarized relay individual to each pair of substations and operative in one sense under control of the line relay thereof, by current flow from one source through one device thereof and being operative in the other sense by current flow from the other source through the other device in the other sense, message register selecting mechanisms selectively operated in accordance with the operation of said polarized relay, means including said selecting mechanism for rendering operative the message register of the calling substation to the exclusion of the other message registers individual to the other substations on said line, and means including said link circuit for operating the selected message register.

3. In a telephone system, a telephone exchange, a telephone line comprising tip and ring conductors extending to said exchange, a link at said exchange connectible to said telephone line on the initiation of a call thereon, two pairs of substations on said line, means including a key at each substation of the first pair to connect the tip conductor of said telephone line to ground on the initiation of a call from either of said last mentioned pair of substations, means including a key at each substation of the second pair of substations being adapted to connect the ring conductor to ground on the initiation of a call from either of them, a unilateral current conducting device at each substation of the first pair connectible to said ring conductor on the operation of its related key, one device of a pair being connected to said ring conductor to pass current in one direction thereover, the other device of the pair being connected to said ring conductor to pass current in the other direction thereover, the unilateral current conducting devices of the second pair of substations being similarly connectible to the tip conductor, a tip line relay associated with each line and adapted to be energized when the tip conductor thereof is grounded, a ring line relay associated with said telephone line and adapted to be energized when the ring conductor thereof is connected to the ground, sources of current of opposite polarity at said exchange, a polarized relay individual to each pair of substations, a circuit for said relay extended in series with the device of the calling substation by the line relay thereof, means for alternately connecting said circuit to said sources of current, said relay being operative in one sense by current flow through one device thereof and being operative in the other sense by current flow through a device in the other sense, message register selecting mechanisms selectively operated in accordance with the operation of said polarized relay, means including said selecting mechanism for rendering operative the message register of the calling substation to the exclusion of the other message registers individual to the other substations on said line, and means including said link circuit for operating the selected message register.

HARRY E. GORDON.

REFERENCES CITED

The following references are of record in the file of this patent:

UNITED STATES PATENTS

| Number | Name | Date |
|---|---|---|
| 1,383,805 | Hall | July 5, 1921 |
| 1,663,747 | Bascom | Mar. 27, 1928 |
| 1,804,766 | Hague | May 12, 1931 |
| 1,831,385 | Hague | Nov. 10, 1931 |
| 1,841,084 | Bragg | Jan. 12, 1932 |
| 2,164,033 | Halligan | June 27, 1939 |